United States Patent
Gaiazov

(10) Patent No.: US 9,489,238 B2
(45) Date of Patent: Nov. 8, 2016

(54) HIERARCHAL SYSTEM OF OBJECTS

(71) Applicant: Dmitrii Igorevich Gaiazov, Yoshkar-Ola (RU)

(72) Inventor: Dmitrii Igorevich Gaiazov, Yoshkar-Ola (RU)

(73) Assignee: E-Studio LLC (Elephant Games) (RU)

( * ) Notice: Subject to any disclaimer, the term of this patent is extended or adjusted under 35 U.S.C. 154(b) by 0 days.

(21) Appl. No.: 14/458,393

(22) Filed: Aug. 13, 2014

(65) Prior Publication Data

US 2015/0007193 A1   Jan. 1, 2015

Related U.S. Application Data

(63) Continuation-in-part of application No. PCT/RU2014/000289, filed on Apr. 21, 2014.

(51) Int. Cl.
*G06F 9/46* (2006.01)
*G06F 9/50* (2006.01)

(52) U.S. Cl.
CPC ............... *G06F 9/50* (2013.01); *G06F 9/5027* (2013.01)

(58) Field of Classification Search
None
See application file for complete search history.

(56) References Cited

U.S. PATENT DOCUMENTS

| | | | | |
|---|---|---|---|---|
| 7,171,540 B1* | 1/2007 | Seidl | ................... | G06F 12/0897 707/999.003 |
| 7,418,710 B1* | 8/2008 | Kaspersky | .............. | G06F 9/465 719/313 |
| 8,130,238 B2 | 3/2012 | Distler | | |
| 2001/0035873 A1* | 11/2001 | Easter | ..................... | G06T 17/00 345/632 |
| 2007/0097138 A1* | 5/2007 | Sorotokin | ........... | G06F 17/2247 345/581 |
| 2007/0179954 A1* | 8/2007 | Kudoh | ................ | G06F 21/6218 |
| 2011/0106795 A1* | 5/2011 | Maim | ................. | G06F 17/2229 707/728 |
| 2011/0219037 A1* | 9/2011 | Card | ......................... | G06F 7/00 707/792 |
| 2013/0120421 A1* | 5/2013 | Maguire | ............... | G06T 15/005 345/581 |

OTHER PUBLICATIONS

Samet et al., "Hierarchical Data Structures and Algorithms for Computer Graphics, Part I", Journal IEEE Computer Graphics and Applications, vol. 8 Issue 3, May 1988, pp. 48-68.*
Wald et al., "Distributed Interactive Ray Tracing of Dynamic Scenes", IEEE Symposium on Parallel and Large-Data Visualization and Graphics, Oct. 21, 2003, pp. 77-85.*

* cited by examiner

*Primary Examiner* — Wei Zhen
*Assistant Examiner* — Timothy Duncan

(57) ABSTRACT

Techniques are disclosed that include instantiating a storage object hierarchy including a root storage object and one or more descendant objects of the root storage object. The storage object hierarchy comprises instantiated objects temporarily denied utilization of the computational resources. The techniques further include instantiating a source object hierarchy including a root source object. The source object hierarchy comprises instantiated objects allowed utilization of the computational resources. The techniques also include receiving a request to execute a process corresponding to a particular object in the storage object hierarchy, relocating the particular object to the source object hierarchy, and allocating a computational resource corresponding to the process to the particular object, thereby allowing utilization of the computational resource by the particular storage object.

17 Claims, 10 Drawing Sheets

HIERARCHAL SYSTEM OF OBJECTS

CROSS-REFERENCE TO RELATED APPLICATIONS

This application is a continuation-in-part of International Application PCT/RU2014/000289 filed on Apr. 21, 2014, which claims priority benefits to Russian Patent Application 2013118989 filed on Apr. 24, 2013, the entire disclosures of which are incorporated herein by reference.

TECHNICAL FIELD

This disclosure relates to a hierarchal system of objects in an object-oriented computing environment, and in particular, systems and methods for managing computational resources required by the system of objects.

BACKGROUND

Many video games and graphics engines require increased amount of computing resources. For example, an intricate video game may require use of a dedicated graphics processor, a physics processor, and/or an increased amount of random access memory. A vast amount of video games and graphics engines are developed in object-oriented programming languages, such as C++, Java, or Python. One benefit of object-oriented programming languages is that they provide the ability for a programmer to define the particular types of data in a program and the routines that are permitted to act on that data.

SUMMARY

An issue that arises in complex object-oriented applications is the sharing of computational resources, e.g., graphics processors, user interfaces, and memory devices, between objects. For example, a video game may include a hierarchy of hundreds or thousands of objects describing a complex environment made up of many different worlds, levels, characters, and backgrounds. Further, each world, level, character, and background may be defined by numerous objects which define shapes, patterns, textures, colors, behaviors, or any other aspect of the higher level object. The rendering of the levels (or portions of the levels) and characters may require significant bandwidth from the graphics processor. Further, as the decision regarding which characters or portions of a level should be rendered is often dependent on user input (e.g., command to move a character to a certain location), the logic of the video game may be configured to render the levels and/or characters that are in the vicinity of the character prior to receiving input that would require the portions and/or characters to be displayed. Such greedy approaches improve overall gameplay but increase demand levied on the computational resources. Furthermore, the processing of user input via a user interface device and which particular user interface devices should accept input may depend on the state of the application.

It is an object of the present invention to simplify shared control of computational resources in object-oriented applications as well as to decrease load experienced by computer units, such as computer engines, and memory devices.

Accordingly, the present disclosure provides a system and techniques for managing computational resources in an object-oriented application. As used herein, the term "object" can refer to an instance of a class that defines a type or types of data and/or routines that operate on the data. The techniques include maintaining two (or more) separate hierarchies of objects, e.g., a source object hierarchy and a storage object hierarchy. The source object hierarchy contains objects which have been allocated one or more computational resources, i.e., objects that have been allowed utilization of the computational resources. The storage object hierarchy contains objects that have been instantiated, but have not been allocated any computational resources, i.e., objects that have been temporarily denied access to the computational resources. The system can include a controller that manages the hierarchy and allocates (or requests allocation of) the computational resources to the objects. As a particular object is referenced, the controller can relocate the object from the storage object hierarchy to the source object hierarchy and allocate the computational resources that the object utilizes, e.g., graphics processor and user interface. When the process referencing the specific object is complete, the controller deallocates the computational resources and moves the object to the storage hierarchy.

Thus, the present invention provides an accelerated processing of separate hierarchies of objects during control of the computational resources.

One aspect of the disclosure provides a method of managing access to a plurality of computational resources. The method includes instantiating, in non-transitory memory, a storage object hierarchy including a root storage object and one or more descendant objects of the root storage object. The storage object hierarchy includes instantiated objects temporarily denied utilization of the computational resources. The method further includes instantiating, in the non-transitory memory, a source object hierarchy including a root source object. The source object hierarchy includes instantiated objects allowed utilization of the computational resources. The method also includes receiving, at a processing device, a request to execute a process corresponding to a particular object in the storage object hierarchy and relocating, at the processing device, the particular object to the source object hierarchy. The method further includes allocating, at the processing device, a computational resource corresponding to the process to the particular object, thereby allowing utilization of the computational resource by the particular storage object.

Implementations of the disclosure may include one or more of the following features. In some implementations, the method further includes completing execution of the requested process, deallocating the computational resource from the particular object, and removing the particular storage object from the source object hierarchy.

According to some implementations, removing the particular storage object from the source object hierarchy includes removing any progeny objects of the particular object from the source object hierarchy, removing any ancestor objects that do not require computational resources and do not have other progeny objects that require computational resources from the source object hierarchy, and adding the particular object, the progeny objects, and the ancestor objects to the storage object hierarchy.

According to some implementations, relocating the particular object includes copying the particular object and any ancestral objects of the particular object to the source object hierarchy.

According to some implementations, the particular object and the ancestral objects remain in the storage object hierarchy after the copying.

According to some implementations, relocating the particular object includes removing the particular object from the storage object hierarchy, removing any progeny objects of the particular object from the storage object hierarchy, removing any ancestor objects of the particular object from the storage object hierarchy, removing any progeny objects of the ancestor objects from the storage object hierarchy, and adding the particular object, the progeny objects of the particular object, the ancestor objects, and the progeny objects of the ancestor objects to the source object hierarchy.

According to some implementations, allocating the computational resource includes determining the computational resource required to perform an operation defined in the particular object, and requesting allocation of the computational resource based on the determination.

According to some implementations, the method further includes requesting deallocation of the computational resource upon completing execution of the operation defined in the particular object.

According to some implementations, the computational resources comprise a graphics processing unit.

According to some implementations, the root source object and the root storage object are defined in a static library.

One aspect of the disclosure provides a computer program product encoded on a non-transitory computer readable storage medium comprising instructions that when executed by a processing device cause the processing device to perform operations for managing computational resources of a computing device. The operations include instantiating, in a memory device, a storage object hierarchy including a root storage object and one or more descendant objects of the root storage object. The storage object hierarchy includes instantiated objects temporarily denied utilization of the computational resources. The operations further include instantiating, in the memory device, a source object hierarchy including a root source object. The source object hierarchy includes instantiated objects allowed utilization of the computational resources. The operations also include receiving a request to execute a process corresponding to a particular object in the storage object hierarchy and relocating the particular object to the source object hierarchy. The operations further include allocating a computational resource corresponding to the process to the particular object, thereby allowing utilization of the computational resource by the particular storage object.

According to some implementations, the operations further include completing execution of the requested process, deallocating the computational resource from the particular object, and removing the particular storage object from the source object hierarchy.

According to some implementations, removing the particular storage object from the source object hierarchy includes removing any progeny objects of the particular object from the source object hierarchy, removing any ancestor objects that do not require computational resources and do not have other progeny objects that require computational resources from the source object hierarchy, and adding the particular object, the progeny objects, and the ancestor objects to the storage object hierarchy.

According to some implementations, relocating the particular object includes copying the particular object and any ancestral objects of the particular object to the source object hierarchy.

According to some implementations, the particular object and the ancestral objects remain in the storage object hierarchy after the copying.

According to implementations, relocating the particular object includes removing the particular object from the storage object hierarchy, removing any progeny objects of the particular object from the storage object hierarchy, removing any ancestor objects of the particular object from the storage object hierarchy, removing any progeny objects of the ancestor objects from the storage object hierarchy, and adding the particular object, the progeny objects of the particular object, the ancestor objects, and the progeny objects of the ancestor objects to the source object hierarchy.

According to some implementations, allocating the computational resource includes determining the computational resource required to perform an operation defined in the particular object, and requesting allocation of the computational resource based on the determination.

According to some implementations, the operations further include requesting deallocation of the computational resource upon completing execution of the operation defined in the particular object.

According to some implementations, the computational resources comprise a graphics processing unit.

According to some implementations, the root source object and the root storage object are defined in a static library.

One aspect of the disclosure provides a method of managing access to a plurality of computational resources. The method includes instantiating, in a non-transitory memory, a storage object hierarchy including a root storage object and one or more descendant objects of the root storage object. The storage object hierarchy includes instantiated objects temporarily denied utilization of the computational resources. The method also includes instantiating, in the non-transitory memory, a source object hierarchy including a root source object. The source object hierarchy includes instantiated objects allowed utilization of the computational resources. The method also includes receiving, at a processing device, a request to execute a process corresponding to a particular object in the storage object hierarchy and determining, at the processing device, a computational resource required to perform an operation defined in the particular object. The method also includes relocating, at the processing device, the particular object to the source object hierarchy and allocating, at the processing device, the computational resource to the particular object, thereby allowing utilization of the computational resource by the particular storage object. The method further includes completing, at the processing device, execution of the requested process, deallocating, at the processing device, the computational resource from the particular object, and removing, at the processing device, the particular storage object from the source object hierarchy.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
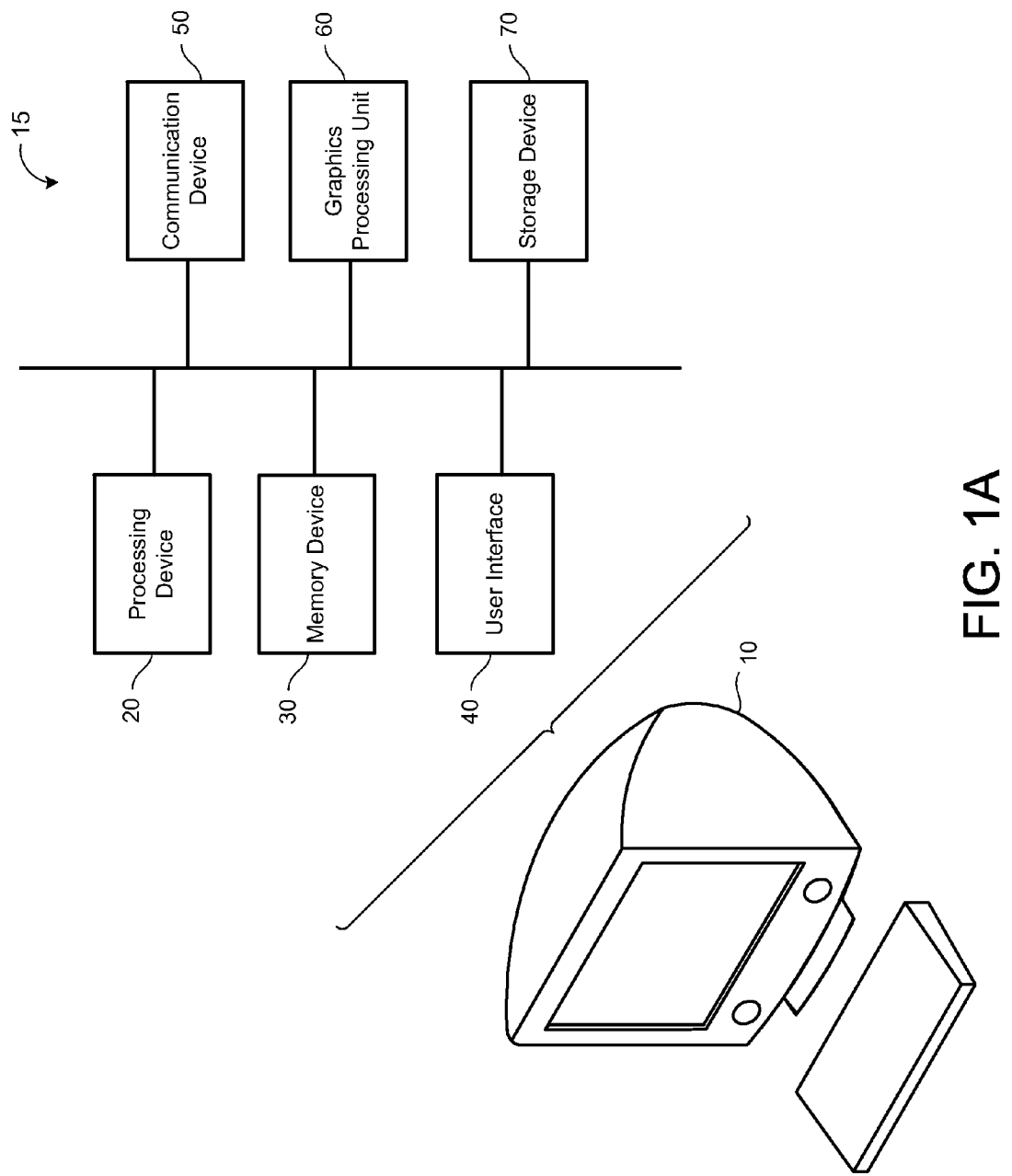
FIG. 1A is a schematic view depicting an exemplary set of computational resources of a computing device.
Figure 1B:
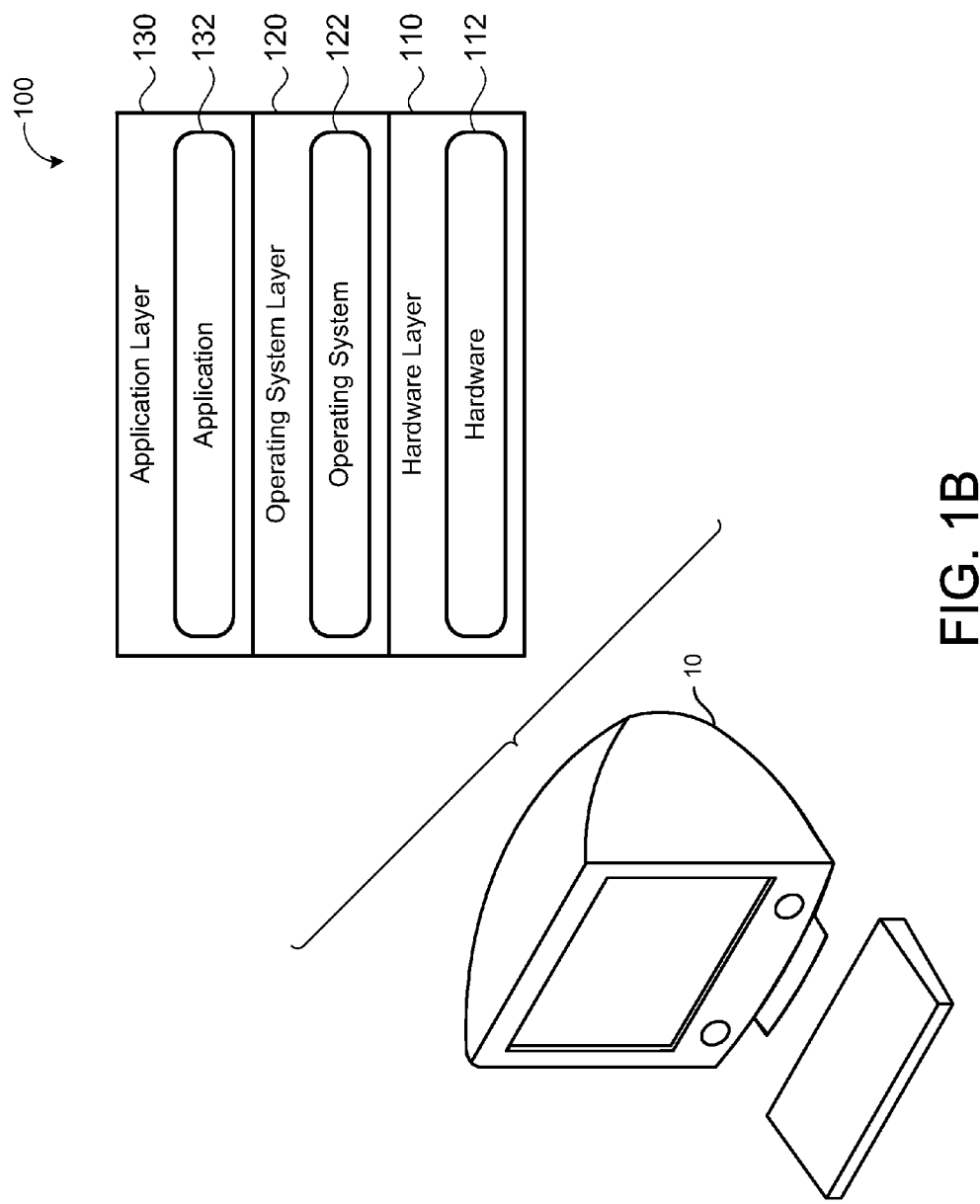
FIG. 1B is a schematic view illustrating an exemplary hierarchy of components of the computing device of FIG. 1A.
Figure 1C:
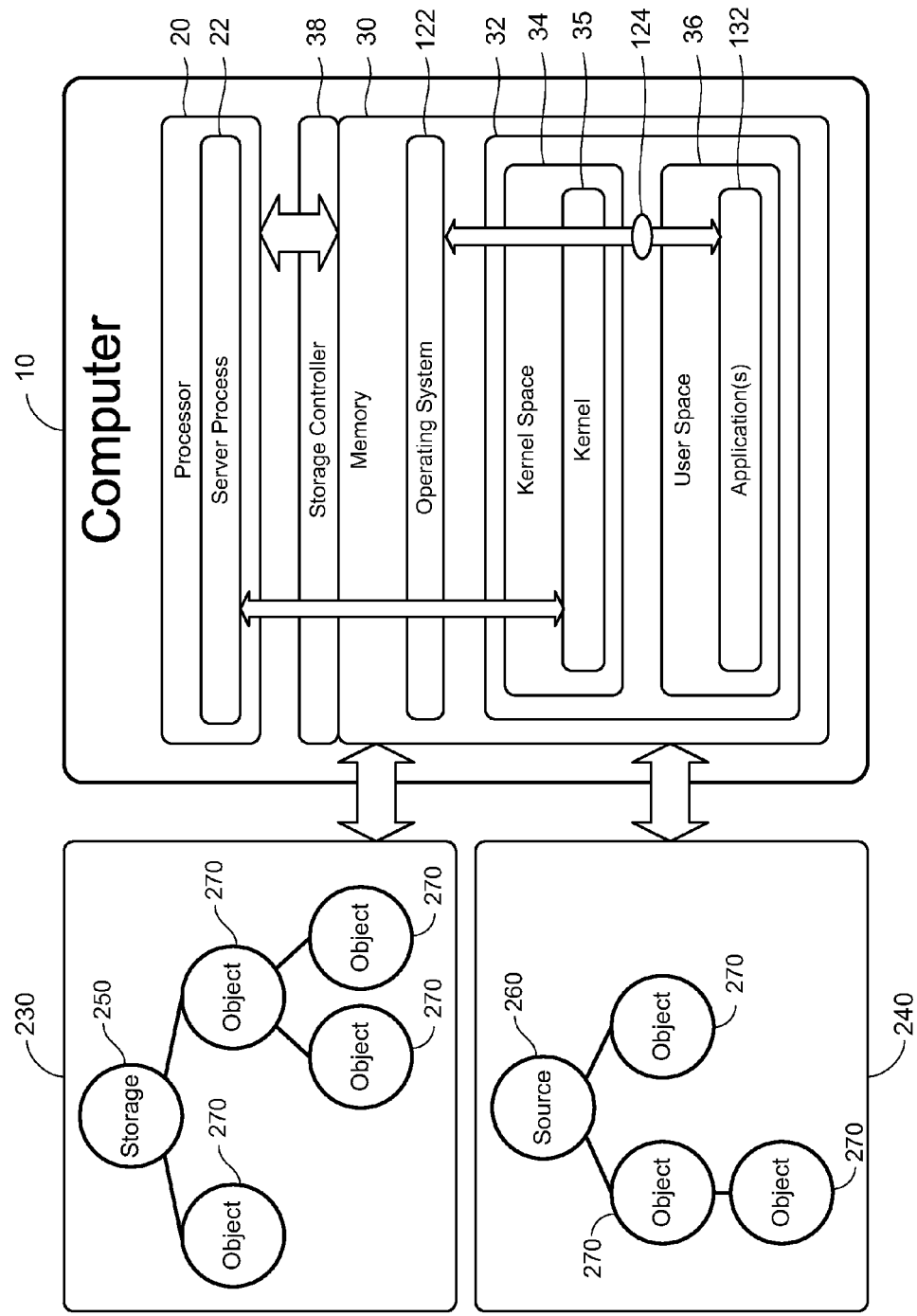
FIG. 1C is a schematic view of an exemplary computer.

Referring to FIGS. 1A-1C, in some implementations, a computing device 10 includes a set of computational resources 15, which may include a processing device 20, a memory device 30, a user interface 40, a communication device 50, a graphics processor 60, and a storage device 70. The set of computational resources 15 is provided for example only and may contain additional and/or alternative resources. Examples of computing devices 10 include, but are not limited to, stationary computing devices (e.g., personal computers), video gaming devices, portable video gaming devices, mobile computing devices (e.g., smartphones and tablet computers), laptop computing devices, and server computing devices.

A hierarchy 100 for the computing device 10 may include a hardware layer 110 for hardware 112, an operating system layer 120 for an operating system 122, and an application layer 130 for applications 132. The hardware layer 110 represents the physical hardware components 112 of the computing environment. For example, the hardware layer 110 can include the computational resources 15. The hardware components 112 are configured to receive instructions and to execute the instructions and/or to support the execution of the instructions.

The processing device 20 executes the operating system 122 of the computing device 10. As used herein, the term "processing device" can include one or more processors and a non-transitory computer readable medium storing computer-readable instructions that are executed by the one or more processors. In implementations having two or more processors, the two or more processors can operate in an individual or a distributed manner. As will be discussed further below, the processing device 20 can execute an operating system 122 of the computing device 10 and higher-level applications 132.

The memory device 30 is a non-transitory computer readable medium of the computing device 10. While one memory device 30 is depicted, the term "memory device" can include one or more computer readable mediums. Examples of memory devices 30 include, but are not limited to, read-only memory (ROM), dynamic random access memory (dRAM), and/or static random access memory (SRAM). The memory device 30 can store storage and source object hierarchies 230, 240. Further, objects 270 located in the source object hierarchy 240 may be provided access to the memory device 30.

The user interface 40 receives input from a user and/or provides output to the user. The term "user interface" includes any device which is configured to receive input from and/or provide output to a user. Examples of user interfaces 40 include, but are not limited to, a keyboard, a mouse, a touchpad, a display device, a touchscreen, a speaker, and a microphone. While one user interface 40 is depicted, the term "user interface" can include one or more user interfaces 40. The processing device 20, in conjunction with the operating system of the computing device 10, can allocate the user interface 40 to one or more applications, thereby providing the application access to the user interface 40.

The communication device 50 performs communication with other remote devices (not shown). The type of communication performed by the communication device 50 can be wired communication and/or wireless communication. Examples of the communication device 50 include, but are not limited to, a transceiver configured to perform communications using the IEEE 802.11 wireless standard, a transceiver configured to perform communications using any of the mobile phone mobile communication standards (e.g., 3G or 4G), an Ethernet port, a Bluetooth transceiver, and a universal serial bus (USB) port. While one communication device 50 is illustrated, the term "communication device" can include one or more communication devices 50. The processing device 20, in conjunction with the operating system 122 of the computing device 10, can allocate the communication device 50 to one or more applications 132, thereby providing the application 132 access to the communication device 50.

The graphics processing unit (GPU) 60 is a specialized processing device configured to render images and store the images in the memory device 30. In particular, the GPU 60 can store the rendered images in a frame buffer. The GPU 60 provides a mechanism for the processing device 20 to offload computationally complex and expensive rendering tasks. The processing device 20, in conjunction with the operating system of the computing device 10, can allocate the GPU 60 to one or more objects, thereby providing the objects access to the GPU 60.

The storage device 70 is a non-transitory computer readable medium of the computing device 10. While one storage device 70 is depicted, the term "storage device" can include one or more computer readable mediums. Examples of storage devices 70 include, but are not limited to, hard disk drives, flash drives, optical storage mediums, magnetic storage mediums. The storage device 70 stores applications and data relating to the applications. For example, the storage device 70 stores the object files that are included in the application.

The set of computational resources 15 described above are provided for example. The computing device 10 can have additional computational resources or less computational resources 15. Variations of the computing device 10 are contemplated and are within the scope of the disclosure.

Referring to FIG. 1B, the operating system layer 120 is an interface between the hardware layer 110 and higher level software applications 132 in the application layer 130. The operating system 122, when executing higher level applications 132, can load computer-readable instructions embodying the higher level application 132 and data referenced by the higher level application 132. The operating system 122 can also allocate resources, e.g., the processing device 20, the user interface 40, and the GPU 60, to the higher-level application 132.

Referring also to FIG. 1C, the operating system 122 executing on the processing device 20 may segregate virtual memory 32 into kernel space 34 and user space 36. The kernel space 34 is reserved for running a kernel 35 of the operating system 122, kernel extensions, and optionally device drivers. The user space 36 is the memory area where all user mode applications 132 work and this memory can be swapped out when necessary. The kernel 35 may be a bridge between the application(s) 132 and the actual data processing done at the hardware level on the processor device 20. Moreover, the kernel's responsibilities may include managing the system resources (e.g., the communication between hardware and software components). The processing device 20 may execute a processor service 22 that communicates with the kernel 35. As a basic component of the operating system 122, the kernel 35 can provide the lowest-level abstraction layer for hardware resources 112 (e.g., the processor(s) 20 and I/O devices) that application software must control to perform its function. The kernel 35 may make these facilities available to application processes through inter-process communications and system calls. A storage controller 38 may manage the memory 30. In some examples, the storage controller 38 receives a virtual address and translates that address to a physical address in memory 30.

The operating system 122 executes software applications 132 residing at the application layer 130. Assuming the application 132 is an object-oriented program, the operating system 122 loads and instantiates one or more objects in the user space 36 of the memory device 30. The operating system 122 can retrieve the one or more objects from the storage device 70. Once an object is instantiated in the user space, the operating system 122 can allocate one or more of the computational resources 15 to the object. The computational resources 15 that are allocated to the object depend on the data and routines defined in the object. Once a computational resource 15 has been allocated to an object, the object can utilize the allocated resource to carry out its intended function.

Figure 2:
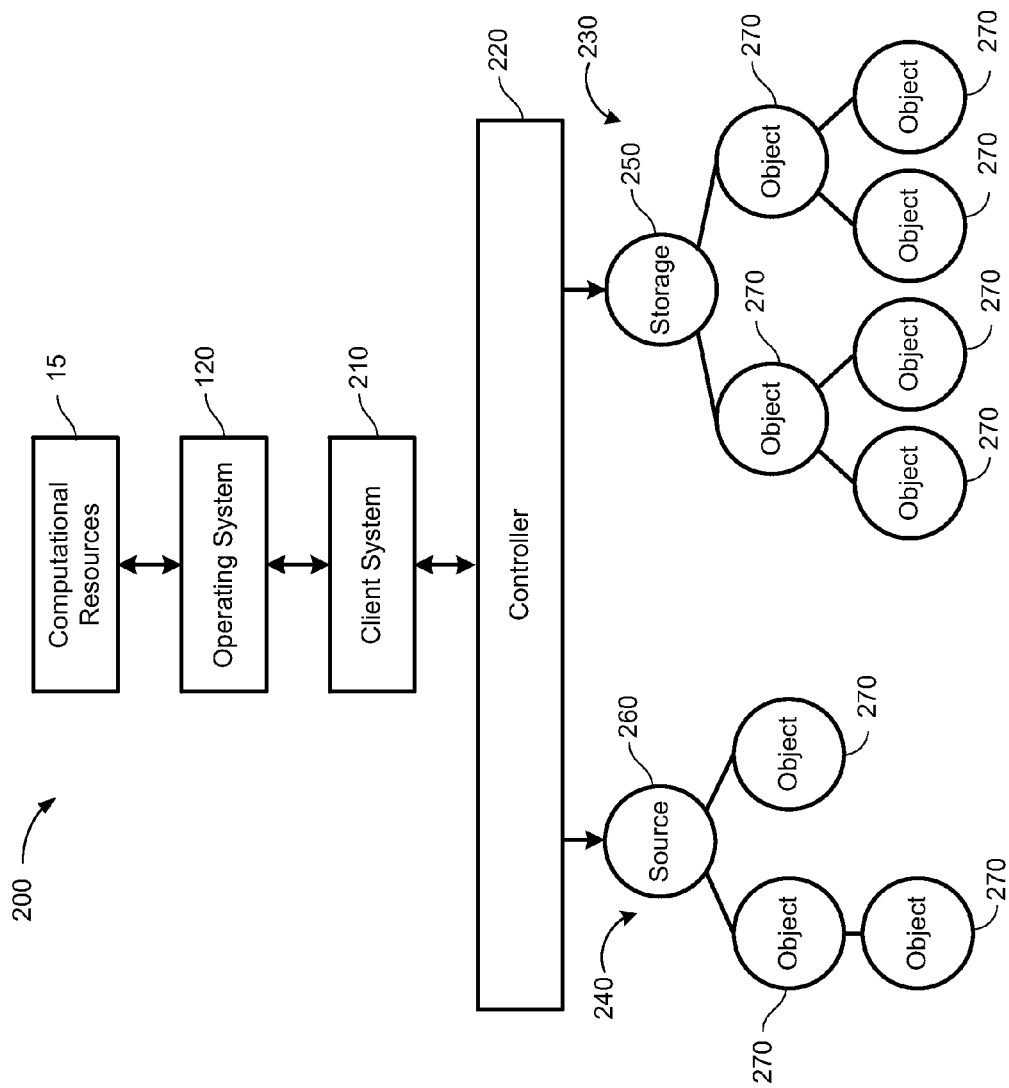
FIG. 2 is a schematic view illustrating an exemplary system for managing the allocation of a set of computational resources using a source object hierarchy and a storage object hierarchy.

Referring to FIG. 2, in some implementations, a system 200 for managing a set of computational resources 15 includes the operating system 120, a client 210, a controller 220, a storage object hierarchy 230, and a source object hierarchy 240. The computational resources 15 can support the operating system 120 and higher-level applications 132, including the client 210, the controller 220, and the source object hierarchy 240. In some implementations, the client 210 and the controller 220 are embodied as computer-readable instructions that are part of a static library, which can be called and included in the code of an application 132.

In some implementations, the client 210, the controller 220, and the object hierarchies 230 and 240 are one or more application 132 executing on the processing device 20 or a remote processing service (e.g., a cloud service). The client 210 interfaces between the operating system 120 and the controller 220. The controller 220 monitors the state of the object hierarchies 230, 240 and any input received from the operating system 120 to determine which descendant objects 270 should be included in the source object hierarchy 240. The storage object hierarchy 230 includes a root storage object 250 and one or more descendant objects 270 that have been instantiated but are temporarily denied access to the computational resources 15. The source object hierarchy 240 includes a root source object 260 and can include one or more descendant objects 270 that have been instantiated and are provided access to one or more of the computational resources 15. Prior to instantiation, the controller 220 can retrieve the descendant objects 270 from the storage device 70 (FIG. 1A). In some implementations, the root storage object 250 and the root source object 260 are defined in the static library. The root storage object 250 and the root source object 260 can be configured to maintain the state of its respective hierarchy. Put another way, the root storage object 250 can record which descendant objects 270 are in the storage object hierarchy 230 and the root source object 260 can record which descendant objects 270 are in the source object hierarchy 240.

In operation, the controller 220 monitors the state of the application 132 during runtime to determine whether any objects 270 are required by the application 132. When an object 270 is required by the application 132, the controller 220 relocates the required object 270 to the source object hierarchy 240. As will be discussed below, relocating a particular object from the source hierarchy 240 can include copying the particular object 270 and its ancestors into the source object hierarchy 240 or moving the particular object 270, its progeny, its ancestors, and the ancestors' progeny to the source object hierarchy 240 from the storage object hierarchy 230, such that the moved objects 270 are removed from the storage object hierarchy 230. Once an object 270 is in the source object hierarchy 240, the operating system 122 can allocate one or more computational resources 15 to the object 270.

Figure 3:
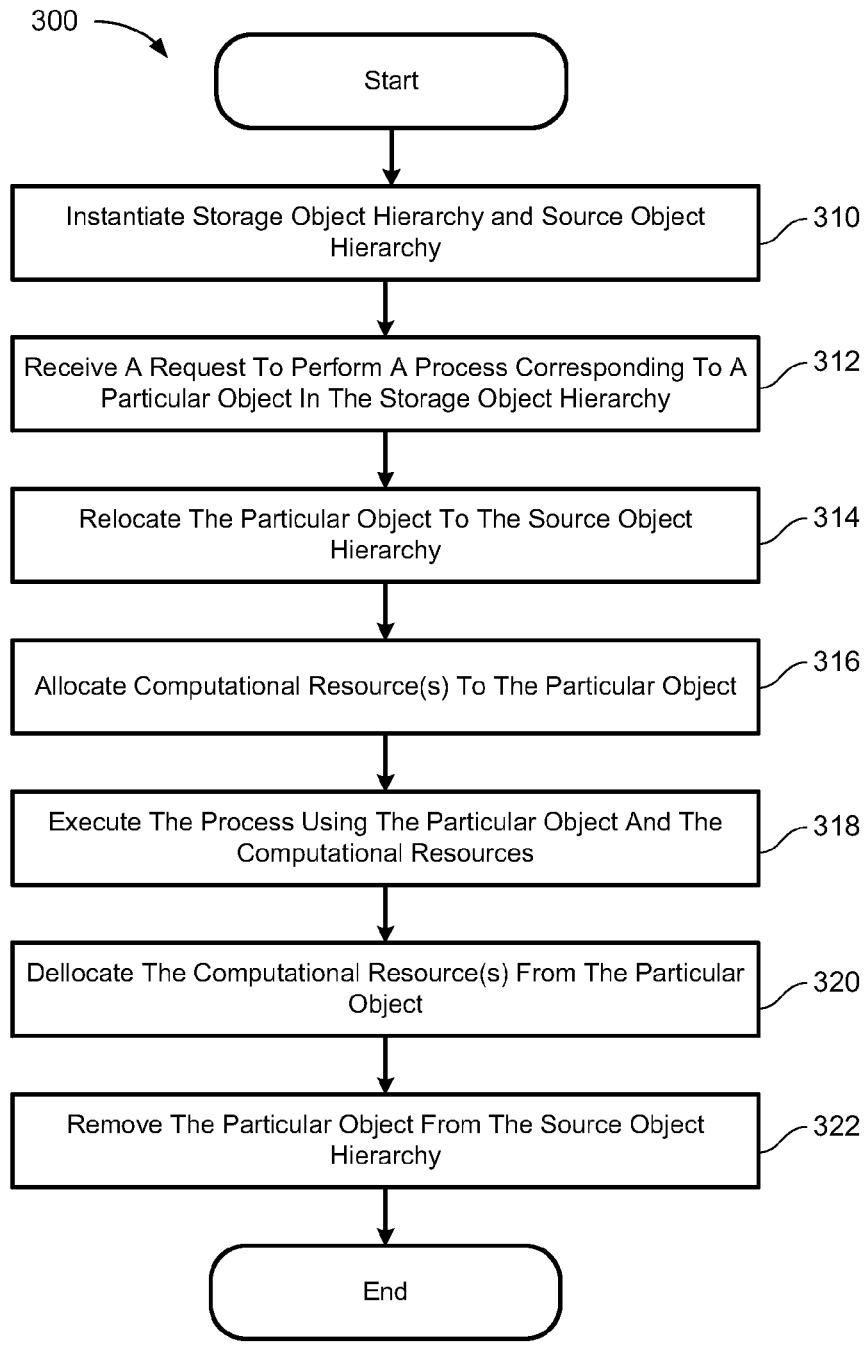
FIG. 3 is a schematic view of an exemplary arrangement of operations for a method of managing the allocation of computational resources.
Figure 4:
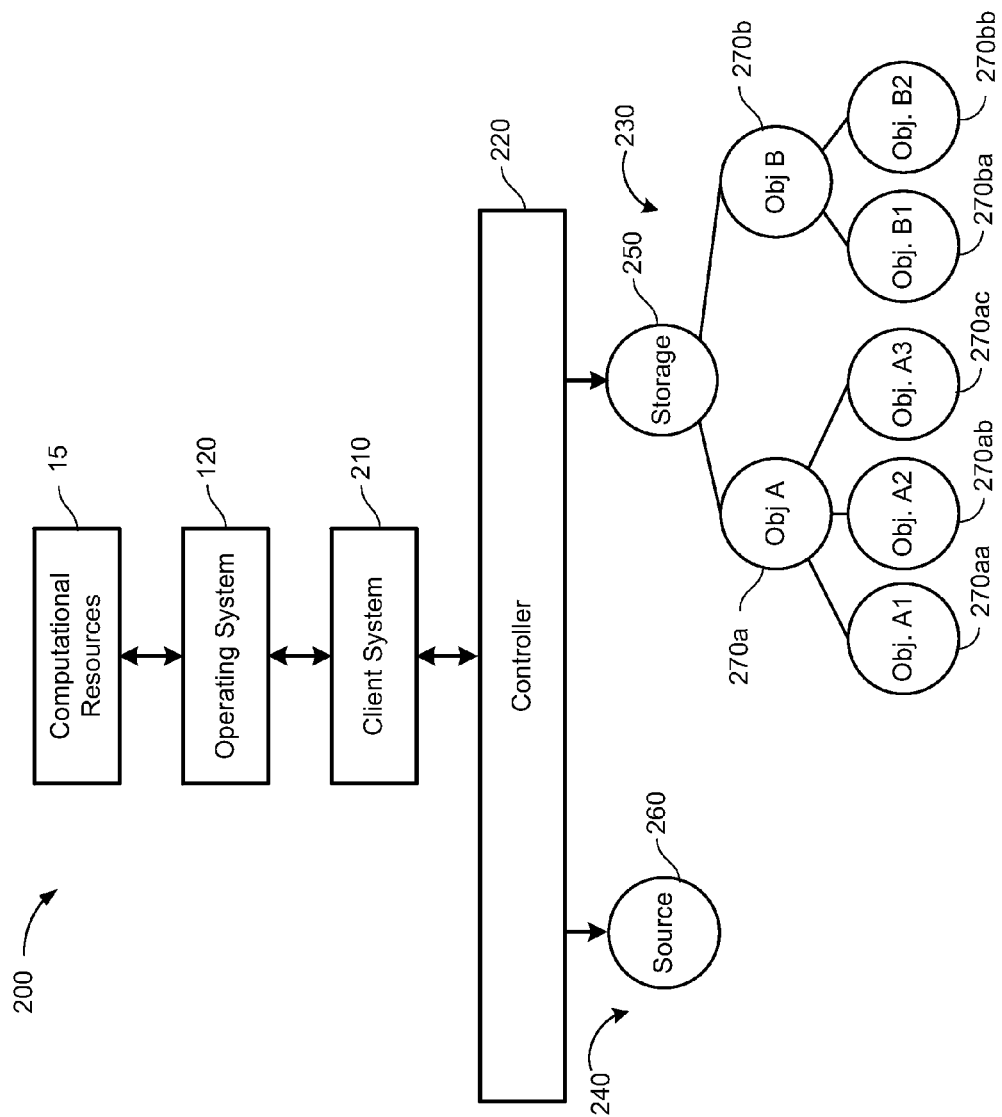
FIG. 4 is a schematic view illustrating an exemplary source object and storage object hierarchies upon instantiation thereof.

According to some implementations, the system of FIG. 3 provides an efficient manner by which to manage computational resources 15 in an object-oriented environment. By implementing the controller 220 and the object hierarchies 230 and 240 in a library, a programmer can devote less focus to controlling allocation/deallocation of resources 15 to/from objects 270 and turning off objects 270 when they are no longer being used. Similarly, a programmer can focus less attention to storing objects 270 when the objects 270 are not being used but may become necessary again and/or deleting objects.

FIG. 3 illustrates an exemplary arrangement of operations for a method 300 for managing computational resources 15 of a computing device 10 (FIG. 1). The method 300 is explained with reference to FIGS. 4-6B, which depict an exemplary application that is being executed by the system 200 of FIG. 2. In the examples shown, the operating system 122 requests performance of a process corresponding to a particular object 270AA of the application 132.

At operation 310, the controller 220 instantiates the storage object hierarchy 230 and the source object hierarchy 240 in the memory device 30. The storage object hierarchy 230 may include the root storage object 250 and one or descendant objects 270 that arc referenced by the application 132. The processing device 20 can instantiate the one or more objects 270 defined by the application 132 and can store the instantiated objects 270 in the memory device 50 as part of the storage object hierarchy 230. In the illustrated example of FIG. 4, instantiated objects 270a and 270b are initially included in the storage object hierarchy 230. Furthermore, instantiated objects 270aa, 270ab, and 270ac are the progeny of object 270a and are included in the storage object hierarchy 230. Similarly, instantiated objects 270ba and 270bb are the progeny of object 270b and are also included in the storage object hierarchy 230 and objects 270ba and 270bb, which are the progeny of object 270b. The controller 220 further instantiates the root source object 260, which is the root of the source object hierarchy 240. At this juncture, the application 132 (or a portion thereof) has been loaded into memory 30, but no computational resources 15 have been allocated to the application 132.

At operation 312, the controller 220 receives a request 124 (FIG. 1C) to perform a process corresponding to a particular object 270, e.g., object 270aa. The controller 220 may receive the request 124 from the operating system 122 via the client 210. For example, if the operating system 122 receives user input via the user interface 40 requesting that the application 132 perform a certain function, e.g., move a character in a video game in a specific direction, the operating system 122 provides the request 124 to the controller 220 via the client 210. In some scenarios, the request 124 may implicate one or more objects 270 that have not been allocated any computational resources 15. For example, in the context of a video game, a request 124 to move a character into another room may require the rendering of the other room, the contents of which may be defined in an object 270 that does not have any computational resources 15 allocated thereto, e.g., the GPU 60 is not allocated to the object 270.

At operation 314, the controller 220 relocates the particular object 270aa to the source object hierarchy 240 in response to the request. In some implementations, the controller 220 relocates the particular object 270aa by copying the particular object 270aa and any ancestor objects 270, e.g., parents, grandparents, and grandparents, into the source object hierarchy 240. It is noted that as used herein, the term "ancestor object" excludes the root source object 260 or the root storage object 250. Copying the particular object 270aa to the source object hierarchy 240 can include adding references or pointers to the particular object 270aa from one or more objects 260 or 270 in the source object hierarchy 240. In these implementations, the structure of the storage object hierarchy 230 is left intact. For example, in the example of FIG. 5A, the controller 220 copies the particular object 270aa and its parent object 270a into the source object hierarchy 240. The controller 220 only needs to copy the ancestral objects of the particular object 270aa to preserve the hierarchy above the particular object 270aa.

In some implementations, the controller 220 relocates the particular object 270aa by moving the particular object 270aa, its progeny objects, its ancestor objects, and their progeny objects into the source object hierarchy 240. FIG. 5B illustrates an example of moving a particular object 270aa into the source object hierarchy 240. In the illustrated example, the particular object 270aa does not have any progeny. The controller 220 moves the parent object 270a and its other progeny objects 270, i.e., object 270ab and object 270ac, to the source object hierarchy 240 with the particular object 270aa. In this way, the controller 220 preserves the hierarchies of the particular object 270aa and its sibling objects 270ab and 270ac. Moving the particular object 270aa can include removing any references or pointers to the particular object 270aa and its related objects 270 from the storage object hierarchy 230 and adding references and/or pointers to the particular object 270aa and its related objects in the source object hierarchy 240.

Figure 5A:
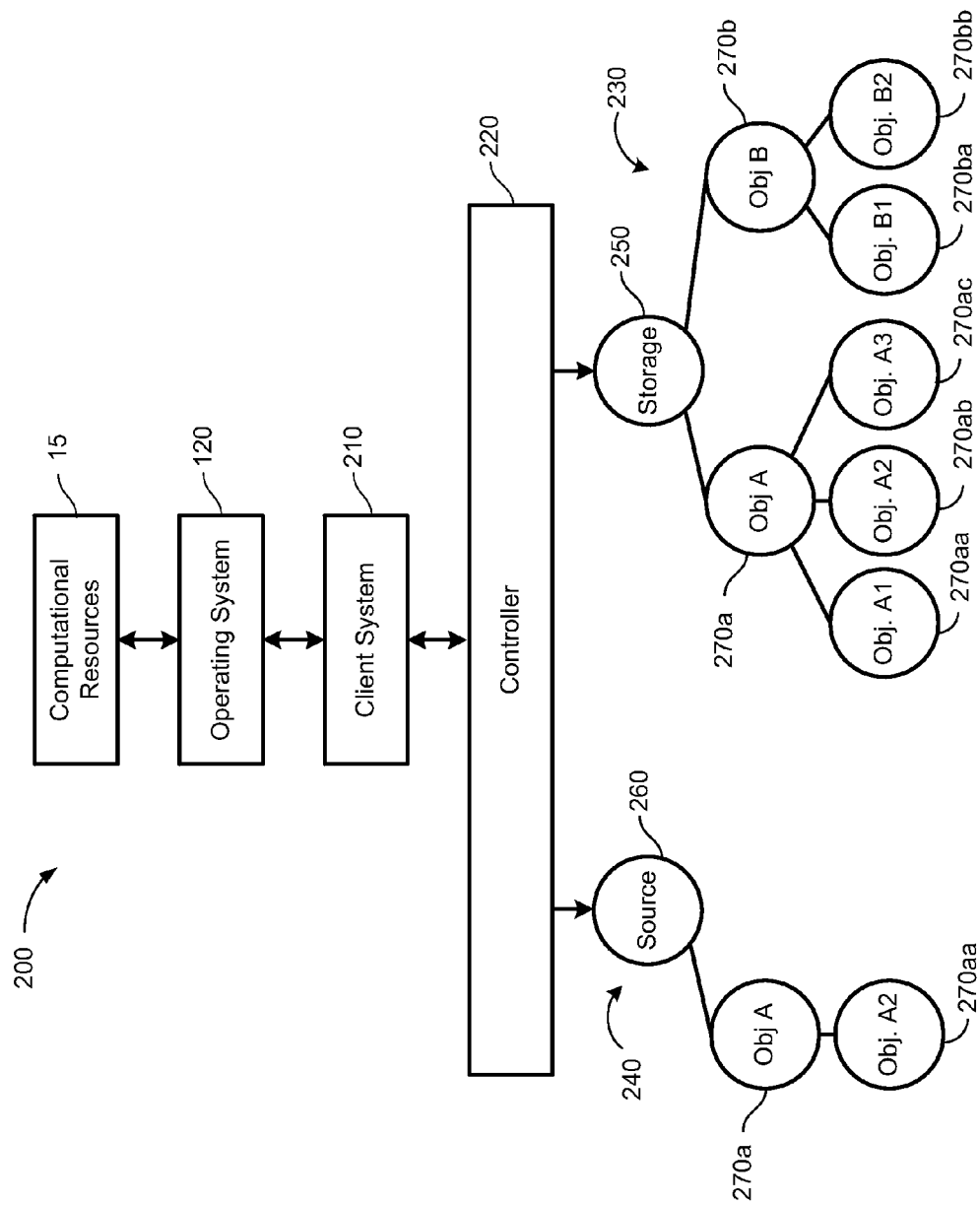
FIGS. 5A and 5B are schematic views illustrating examples of relocating a particular object to the storage object hierarchy.
Figure 5B:
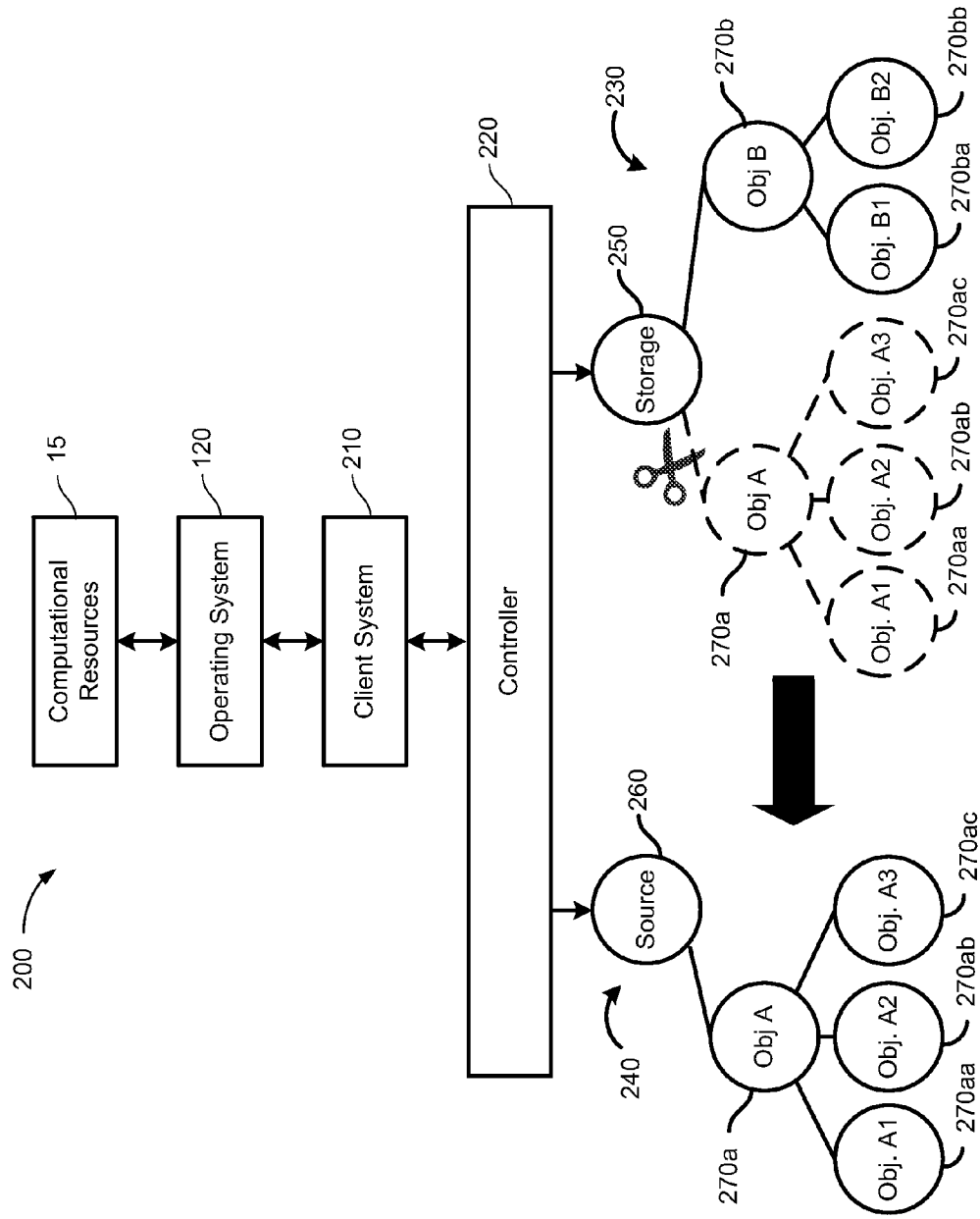

The "copying" technique illustrated in FIG. 5A minimizes the amount of computational resources that are ultimately allocated, as the sibling objects 270ab and 270ac are not copied into the source object hierarchy 240. The copying technique, however, may result in additional memory 30 being used to maintain the source object hierarchy 240 and the storage object hierarchy 230, as complex applications may have hundreds or thousands of objects 270 being duplicated in the two hierarchies 230 and 240. Conversely, the "moving" technique illustrated in FIG. 5B may reduce the amount of memory 30 that is used, but may increase the demand on the computational resources 15 as objects 270 are moved into the source object hierarchy 240 which are not implicated by the requested process, e.g., sibling object 270ab, may nonetheless be allocated computational resources 15. Other techniques for relocating the particular object 270aa can be implemented without departing from the scope of the disclosure. For example, a hybrid approach may be implemented, whereby the particular object 270aa and its progeny are moved to the source object hierarchy 240, but the ancestor objects, e.g., object 270a, is copied to the source object hierarchy 240.

At operation 316, the controller 220 requests that the operating system 122 allocate computational resources 15 to the particular object 270aa (as well as the other objects relocated to the source object hierarchy 240). The controller 220 can determine the operations and variables that are defined in the particular object 270aa and the computational resources 15 that are required to perform the operations and store the variables. For example, if the particular object 270aa includes a variable and a write operation, the controller 220 can determine the amount of memory 30 required to perform the write operation based on the type of the variable and can request that the operating system 122 allocate sufficient memory space 32 on the memory device 30 to perform the write operation. Similarly, if the particular object 270aa includes graphics rendering operations, the controller 220 can request that the operating system 122 provide the particular object 270aa access to the GPU 50 and allocate sufficient memory space 32 in the memory device 30 to store the rendered graphics. The controller 220 can determine and request the computational resources 15 required by the particular object 270aa in any other suitable manner. In response to the request 124, the operating system 122 allocates the resources 15 to the particular object 270aa. The techniques used to allocate resources 15 for the particular object 270aa may vary depending on the operating system 122, the operations defined in the particular object 270aa, the progeny and ancestors of the particular object 270aa, the computational resources 15 required, and the programming language of the application 132.

The method further includes executing the requested process, at operation 318. During execution of the process, the allocated computational resources 15 may be utilized by the particular object 270aa. Upon completion of the process, the operating system 122 deallocates the allocated computational resources 15, as shown at operation 320. The operating system 122 can deallocate the computational resources 15 in any suitable manner. The techniques used to deallocate the computational resources 15 that were allocated to the particular object 270aa may vary depending on the operating system 122, the operations defined in the particular object 270aa, the progeny and ancestors of the particular object 270aa, the computational resources 15 required, and the programming language.

Figure 6A:
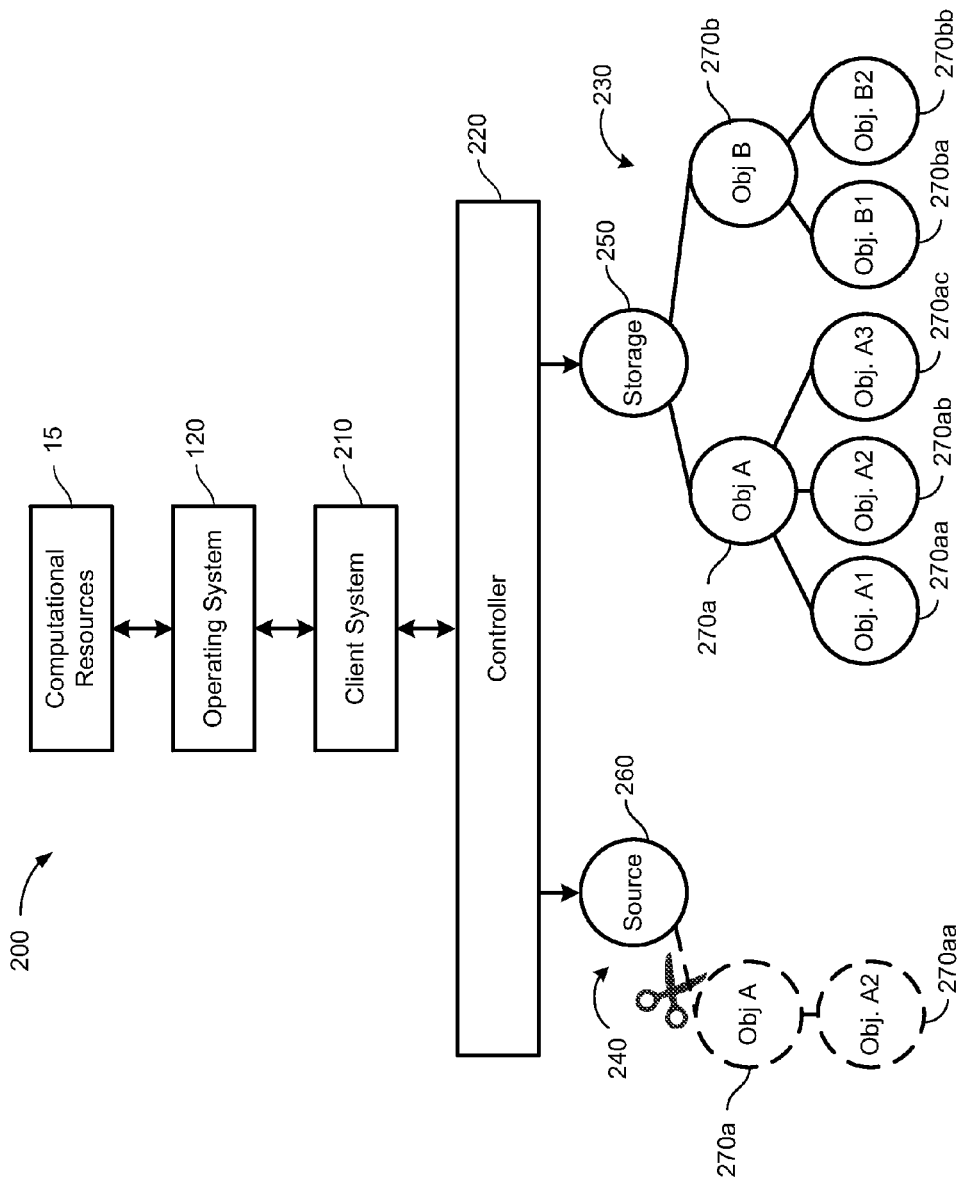
FIGS. 6A and 6B are schematic views illustrating examples of removing a particular object from the source object hierarchy.

At operation 322, the controller 220 removes the particular object 270aa from the source object hierarchy 240. In implementations where the controller 220 relocates the particular object 270aa via the copying technique (e.g., FIG. 5A), the controller 220 simply removes the particular object 270aa and any of its ancestors which no longer require computational resources 15 from the source object hierarchy 240. Removing the particular object 270aa can include removing any references or pointers to the particular object 270aa from the source object hierarchy 240. FIG. 6A illustrates an example of the controller 220 removing the particular object 270aa from the source object hierarchy 240. In the illustrated example, the controller 220 removes the particular object 270aa and its parent object 270a from the source object hierarchy 240. The controller 220 does not, however, have to change the state of the storage object hierarchy 230, as the particular object 270aa and its parent object 270a remained in the storage object hierarchy 230 when the particular object 270aa was relocated to the source object hierarchy 240.

Figure 6B:
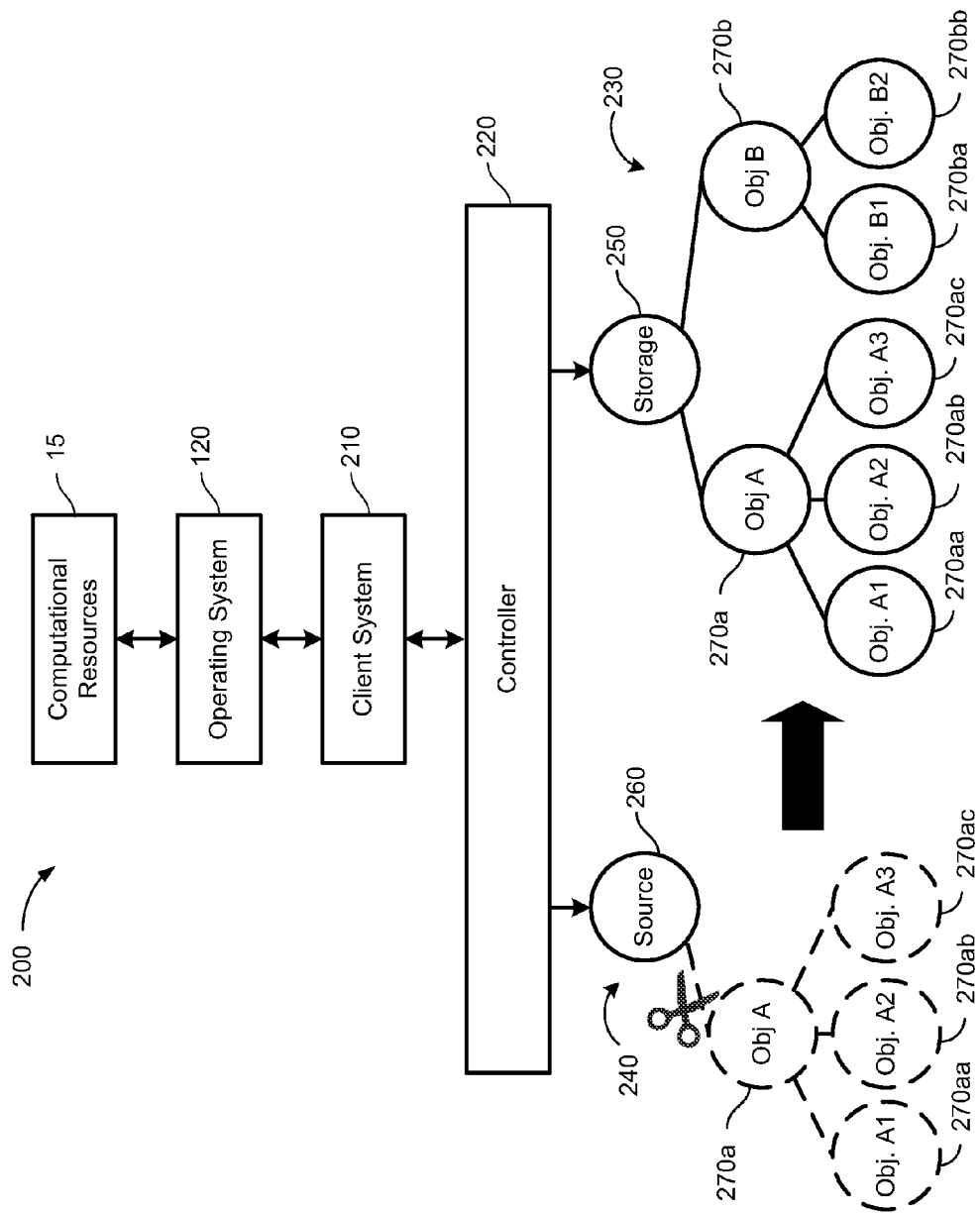

In implementations were the controller 220 relocates the particular object 270*aa* to the source object hierarchy 240 via the moving technique, the controller 220 removes the particular object 270*aa* from the source object hierarchy 240 by moving the particular object 270*aa* and its related objects 270 ((i.e., the particular object's 270*aa* progeny objects, its ancestor objects, and the progeny objects of the ancestor objects) from the source object hierarchy 240 to the storage object hierarchy 230. Moving the particular object 270*aa* can include removing any references or pointers to the particular object 270*aa* and its related objects 270 from the source object hierarchy 240 and adding references and/or pointers to the particular object 270*aa* and its related objects 270 in the storage object hierarchy 230. FIG. 6B illustrates an example of the controller 220 removing the particular object 270*aa* from the source object hierarchy 240. In the illustrated example, the controller 220 removes the particular object 270*aa*, its parent object 270*a*, and its sibling objects 270*ab* and 270*ac* from the source object hierarchy 240. The controller 220 further adds the particular object 270*aa*, its parent object 270*a*, and its sibling objects 270*ab* and 270*ac* to the storage object hierarchy 230.

Other techniques for moving the particular object 270*aa* can be implemented without departing from the scope of the disclosure. For example, a hybrid approach may be implemented, whereby the particular object 270*aa* and its progeny are moved back to the source object hierarchy 240, but the ancestor objects, e.g., object 270*a*, is removed from the source object hierarchy 240 if the ancestor object does not require any additional computational resources 15.

The method 300 may execute throughout execution of the application 132. The method 300 or operations thereof can be executed in parallel and manage the allocation of computational resources 15 to multiple objects 270.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ('WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

The invention claimed is:

1. A method of managing access to a plurality of computational resources, the method comprising:
instantiating, in non-transitory memory, a storage object hierarchy including a root storage object and one or more descendant objects of the root storage object, the storage object hierarchy comprising instantiated objects temporarily denied utilization of the computational resources;
instantiating, in the non-transitory memory, a source object hierarchy including a root source object, the source object hierarchy comprising instantiated objects allowed utilization of the computational resources;
receiving, at a processing device, a request to execute a process corresponding to a particular object in the storage object hierarchy;
relocating, at the processing device, the particular object to the source object hierarchy; and
allocating, at the processing device, a computational resource corresponding to the process to the particular object, thereby allowing utilization of the computational resource by the particular storage object,
wherein relocating the particular object further comprises:
removing the particular object from the storage object hierarchy;
removing any progeny objects of the particular object from the storage object hierarchy;
removing any ancestor objects of the particular object from the storage object hierarchy;
removing any progeny objects of the ancestor objects from the storage object hierarchy; and
adding the particular object, the progeny objects of the particular object, the ancestor objects, and the progeny objects of the ancestor objects to the source object hierarchy.

2. The method of claim 1, further comprising:
completing execution of the requested process;
deallocating the computational resource from the particular object; and
removing the particular storage object from the source object hierarchy.

3. The method of claim 2, wherein removing the particular storage object from the source object hierarchy comprises:
removing any progeny objects of the particular object from the source object hierarchy;

removing any ancestor objects that do not require computational resources and do not have other progeny objects that require computational resources from the source object hierarchy; and adding the particular object, the progeny objects, and the ancestor objects to the storage object hierarchy.

4. The method of claim 1, wherein relocating the particular object includes copying the particular object and any ancestral objects of the particular object to the source object hierarchy.

5. The method of claim 4, wherein the particular object and the ancestral objects remain in the storage object hierarchy after the copying.

6. The method of claim 1, wherein allocating the computational resource comprises:
   determining the computational resource required to perform an operation defined in the particular object; and
   requesting allocation of the computational resource based on the determination.

7. The method of claim 6, further comprising requesting deallocation of the computational resource upon completing execution of the operation defined in the particular object.

8. The method of claim 1, wherein the computational resources comprise a graphics processing unit.

9. The method of claim 1, wherein the root source object and the root storage object are defined in a static library.

10. A computer program product encoded on a non-transitory computer readable storage medium comprising instructions that when executed by a processing device cause the processing device to perform operations for managing computational resources of a computing device, the operations comprising:
    instantiating, in a memory device, a storage object hierarchy including a root storage object and one or more descendant objects of the root storage object, the storage object hierarchy comprising instantiated objects temporarily denied utilization of the computational resources;
    instantiating, in the memory device, a source object hierarchy including a root source object, the source object hierarchy comprising instantiated objects allowed utilization of the computational resources;
    receiving a request to execute a process corresponding to a particular object in the storage object hierarchy;
    relocating the particular object to the source object hierarchy; and
    allocating a computational resource corresponding to the process to the particular object, thereby allowing utilization of the computational resource by the particular storage object, wherein relocating the particular object further comprises:

removing the particular object from the storage object hierarchy;
removing any progeny objects of the particular object from the storage object hierarchy;
removing any ancestor objects of the particular object from the storage object hierarchy;
removing any progeny objects of the ancestor objects from the storage object hierarchy; and
adding the particular object, the progeny objects of the particular object, the ancestor objects, and the progeny objects of the ancestor objects to the source object hierarchy.

11. The computer program product of claim 10, wherein the operations further comprise:
    completing execution of the requested process;
    deallocating the computational resource from the particular object; and
    removing the particular storage object from the source object hierarchy.

12. The computer program product of claim 11, wherein removing the particular storage object from the source object hierarchy comprises:
    removing any progeny objects of the particular object from the source object hierarchy;
    removing any ancestor objects that do not require computational resources and do not have other progeny objects that require computational resources from the source object hierarchy; and
    adding the particular object, the progeny objects, and the ancestor objects to the storage object hierarchy.

13. The computer program product of claim 10, wherein relocating the particular object includes copying the particular object and any ancestral objects of the particular object to the source object hierarchy.

14. The computer program product of claim 12, wherein the particular object and the ancestral objects remain in the storage object hierarchy after the copying.

15. The computer program product of claim 10, wherein allocating the computational resource comprises:
    determining the computational resource required to perform an operation defined in the particular object; and
    requesting allocation of the computational resource based on the determination.

16. The computer program product of claim 10, wherein the computational resources include a graphics processing unit.

17. The computer program product of claim 10, wherein the root source object and the root storage object are defined in a static library.

* * * * *